J. NAIRN.
Feeder and Cooler for Grain Mills.
No. 82,741. Patented Oct. 6, 1868.
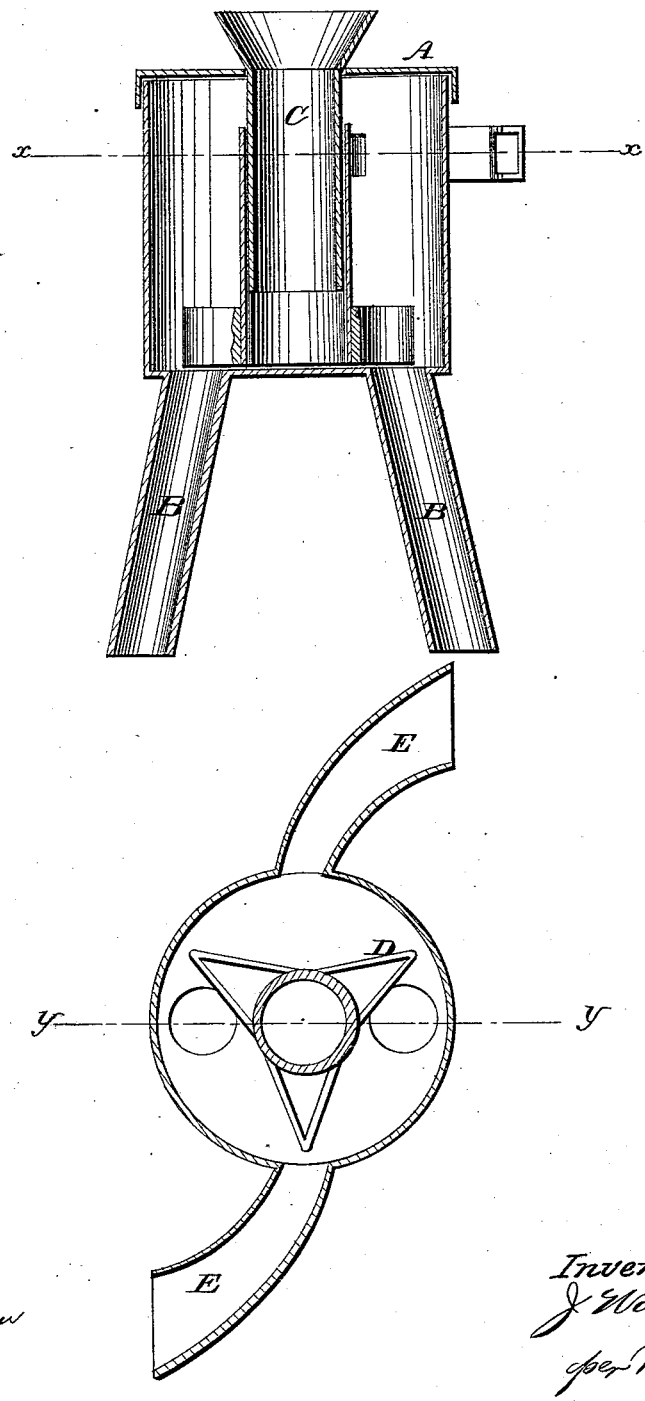

United States Patent Office.

JOHN NAIRN, OF MILTON, INDIANA, ASSIGNOR TO HIMSELF AND MATTHEW PFAFFLIN, OF SAME PLACE.

Letters Patent No. 82,741, dated October 6, 1868.

IMPROVED FEEDING AND COOLING-DEVICE FOR GRAIN-MILLS.

*The Schedule referred to in these Letters Patent and making part of the same.*

TO ALL WHOM IT MAY CONCERN:

Be it known that I, JOHN NAIRN, of Milton, in the county of Wayne, and State of Indiana, have invented a new and useful Improvement in Feeding and Cooling-Apparatus; and I do hereby declare that the following is a full, clear, and exact description thereof, which will enable others skilled in the art to make and use the same, reference being had to the accompanying drawings, forming part of this specification, in which—

Figure 1 represents a sectional elevation of my improved apparatus, and

Figure 2 represents a horizontal section of the same, on the line $x\,x$ of fig. 1.

Similar letters of reference indicate like parts.

The object of this invention is to provide a more improved feeder and cooler for millstones than any now in use.

It consists of a vessel, which is secured to the top of the bail of a running stone, and provided with two tubes extending downward near to the bed-stone, into which the article to be ground is fed by a tube fixed to the mouth of the hopper, and extending near to the bottom of the said vessel, when it is provided with arms, which act as scrapers, when the said vessel rotates by the action of the stone, to force the material into the said tubes. The vessel is also provided with hollow curved arms for gathering and forcing air down through the feeder, to facilitate the feeding and to cool the stones.

A represents the vessel, which is to be secured to the bail of the running stone in its vertical axis, so that the tubes B B will project on either side down near to the bed-stone.

C represents a tube, provided with a funnel-mouth at the top, which receives the grain from the hopper, and is so connected to it as not to rotate, and is provided with arms, D, at the bottom, to act as scrapers for forcing the grain into the tubes B B. It is made in two parts, one sliding into the other, so as to be shortened or elongated.

E E represent the curved lateral tubes, for collecting air and conveying it down into the eye of the stone to facilitate the feeding operation, and also as a circulation to cause the stones to run cool.

My invention is more especially adapted to feeding middlings and other ground stuffs for regrinding, but is also very useful for feeding grain with great regularity.

Having thus described my invention, I claim as new, and desire to secure by Letters Patent—

The arrangement of the vessel A, tubes B B C, and curved lateral tubes E E, and scraper D, when combined and operated substantially as and for the purpose herein described.

JOHN NAIRN.

Witnesses:
MARTIN BROWN,
ISAAC S. DICKEL.